(12) United States Patent
Trainer et al.

(10) Patent No.: US 12,416,244 B2
(45) Date of Patent: Sep. 16, 2025

(54) AIRCRAFT POWER AND PROPULSION SYSTEMS COMPRISING PERMANENT MAGNET ELECTRICAL MACHINES

(71) Applicant: ROLLS-ROYCE plc, London (GB)

(72) Inventors: David R Trainer, Derby (GB); Ellis F H Chong, Derby (GB); Mark Sweet, Chesterfield (GB); Gian Incerpi, Buckingham (GB)

(73) Assignee: ROLLS-ROYCE plc, London (GB)

( * ) Notice: Subject to any disclaimer, the term of this patent is extended or adjusted under 35 U.S.C. 154(b) by 30 days.

(21) Appl. No.: 18/204,068

(22) Filed: May 31, 2023

(65) Prior Publication Data
US 2024/0084710 A1 Mar. 14, 2024

(30) Foreign Application Priority Data
Jun. 27, 2022 (GB) ...................................... 2209357

(51) Int. Cl.
| | | |
|---|---|---|
| *F01D 15/10* | (2006.01) | |
| *B64D 27/24* | (2006.01) | |
| *B64D 27/02* | (2006.01) | |

(52) U.S. Cl.
CPC ............ *F01D 15/10* (2013.01); *B64D 27/24* (2013.01); *B64D 27/026* (2024.01); *F05D 2220/323* (2013.01); *F05D 2220/764* (2013.01)

(58) Field of Classification Search
None
See application file for complete search history.

(56) References Cited

U.S. PATENT DOCUMENTS

| | | | | |
|---|---|---|---|---|
| 6,894,455 | B2 | 5/2005 | Cai et al. | |
| 9,803,553 | B2 * | 10/2017 | Smith | F02C 7/275 |
| 10,498,576 | B2 * | 12/2019 | Baldemair | H04L 27/2607 |
| 10,794,191 | B1 * | 10/2020 | Warner | F01D 5/141 |
| 10,903,770 | B1 * | 1/2021 | Goche | H02K 53/00 |

(Continued)

FOREIGN PATENT DOCUMENTS

| | | |
|---|---|---|
| CN | 111478642 A | 7/2020 |
| EP | 1 707 429 A1 | 10/2006 |

(Continued)

OTHER PUBLICATIONS

Nov. 2, 2023 Extended Search Report issued in European Patent Application No. 23175008.4.

(Continued)

*Primary Examiner* — Gerald L Sung
*Assistant Examiner* — Jacek Lisowski
(74) *Attorney, Agent, or Firm* — Oliff PLC

(57) ABSTRACT

Reconfigurable permanent magnet electrical machines and aircraft power and propulsion systems including the electrical machines. An aircraft power and propulsion system includes: a gas turbine engine; DC electrical network; permanent magnet electrical machine including a rotor drivingly coupled to a spool of the engine, and a stator including windings controllably switchable between a star and a delta configuration; an AC-DC power electronics converter, an AC side is connected to terminals of the stator windings and a DC side is connected to the DC electrical network; an additional electrical power source connected to and controllable to supply electrical power to the DC electrical network; and a control system configured to control the switching of the stator windings between the configurations and to control the additional electrical power source to supply electrical power to the DC electrical network during a time interval when the stator is being switched between the configurations.

19 Claims, 8 Drawing Sheets

(56) References Cited

U.S. PATENT DOCUMENTS

| | | | |
|---|---|---|---|
| 2016/0023773 A1* | 1/2016 | Himmelmann | B64D 35/024 |
| | | | 903/903 |
| 2018/0050807 A1* | 2/2018 | Kupiszewski | B64D 27/24 |
| 2018/0283294 A1 | 10/2018 | Matsuyama et al. | |
| 2020/0076333 A1 | 3/2020 | McElveen, Jr. et al. | |
| 2020/0157966 A1* | 5/2020 | Huang | F02C 7/32 |
| 2020/0307392 A1 | 10/2020 | Joseph et al. | |
| 2020/0321899 A1 | 10/2020 | Akutsu | |
| 2021/0242815 A1 | 8/2021 | Hongyo et al. | |
| 2022/0307425 A1 | 9/2022 | Boecke et al. | |
| 2022/0316748 A1* | 10/2022 | Shizu | H02K 1/12 |
| 2022/0399846 A1* | 12/2022 | Shizu | H02P 25/18 |

FOREIGN PATENT DOCUMENTS

| | | |
|---|---|---|
| EP | 3 001 548 A1 | 3/2016 |
| EP | 3 258 592 A1 | 12/2017 |
| WO | 2009/070089 A1 | 6/2009 |
| WO | 2017/216259 A1 | 12/2017 |
| WO | 2021/194482 A1 | 9/2021 |

OTHER PUBLICATIONS

Dec. 9, 2022 Combined Search and Examination Report issued in British Application No. 2209357.9.

Dec. 12, 2022 Combined Search and Examination Report issued in British Application No. 2209356.1.

May 31, 2023 U.S. Appl. No. 18/204,112 filed in the name of David R Trainer et al.

Nov. 8, 2023 Extended Search Report issued in European Patent Application No. 23175009.2.

Apr. 8, 2025 Office Action issued in European Patent Application No. 23175009.2.

\* cited by examiner

AIRCRAFT POWER AND PROPULSION SYSTEMS COMPRISING PERMANENT MAGNET ELECTRICAL MACHINES

CROSS-REFERENCE TO RELATE APPLICATIONS

This specification is based upon and claims the benefit of priority from United Kingdom Patent Application No. 2209357.9, filed 27 Jun. 2022, the entire contents of which are incorporated herein by reference.

TECHNICAL FIELD

This disclosure relates to permanent magnet electrical machines with reconfigurable stator windings, to aircraft power and propulsion systems comprising such electrical machines and to methods of operating such power and propulsion systems.

BACKGROUND

In aerospace, there is a trend towards aircraft and their propulsion systems becoming 'more electric' in their design. For example, aircraft and engine systems and accessories which have previously been mechanically, pneumatically or hydraulically powered may be replaced with electrically powered equivalents. Spool-coupled electrical machines with high power ratings may be utilized to increase the power generation capability to meet the increased electrical power demand. Spool-coupled electrical machines may also be used to accelerate or decelerate the spools of the engines to improve engine operability, for example to improve engine surge margin and reduce fuel consumption. Hybrid electric aircraft similarly utilize a large amount of electrical power to power propulsive and non-propulsive electrical loads.

A number of different types of electrical machine are available for use in these platforms, however permanent magnet synchronous machines (PMSMs) are a particularly attractive option because of their high power density and relative simplicity of design and operation. Permanent magnet machines, operable as motors and/or generators, comprise a stator with stator windings and a rotor carrying permanent magnets.

With the absence of windings in the rotor of a permanent magnet machine, the internal voltage (or back EMF) in the stator windings changes in proportion to the rotational speed of the rotor. This may lead to design challenges in aerospace applications because the rotors can be subject to high speed ranges. In many cases this is a result of the fact that the primary purpose of the prime movers which are drivingly coupled with the rotors is, often, thrust generation and thus the engine shafts and electrical machine rotors cannot be controlled to maintain a speed that is optimum for the design of the electrical machine.

The result is a significant range (e.g., 2:1 or greater) in the voltages developed across the terminals of the stators of the permanent magnet electrical machines. If the electrical machines are optimized for high-speed engine operation, the system may be unable to generate a desired amount of electrical power at low-speed engine operation (e.g., low thrust operation). Conversely, electrical machines optimized for low-speed operation may produce undesirably high terminal voltages during high-speed engine operation (e.g., high thrust operation) resulting in high on-state losses in the power electronics.

SUMMARY

According to a first aspect, there is provided an aircraft power and propulsion system, comprising: a gas turbine engine; a DC electrical network; a permanent magnet electrical machine; an AC:DC power electronics converter; an additional electrical power source; and a control system. The electrical machine comprises a rotor drivingly coupled to a spool of the gas turbine engine and a stator comprising windings controllably switchable between a star configuration and a delta configuration. An AC side of the AC:DC power electronics converter is connected to terminals of the stator windings of the electrical machine. A DC side of the AC:DC power electronics converter is connected to the DC electrical network. The additional electrical power source is connected to and controllable to supply electrical power to the DC electrical network. The control system is configured to control the switching of the stator windings between the star configuration and the delta configuration and to control the additional electrical power source to supply electrical power to the DC electrical network during a time interval when the stator is being switched between the star configuration and the delta configuration.

The additional electrical power source may comprise an electrical energy storage unit (e.g., one or more batteries and/or capacitors). The control system may be configured to control the electrical energy storage unit to discharge during the time interval when the stator is being switched between the star configuration and the delta configuration.

The permanent magnet electrical machine may be a first electrical machine and the additional electrical power source may comprise a second electrical machine. The power and propulsion system may further comprise a second AC:DC power electronics converter, an AC side of which is connected to terminals of windings of the second electrical machine and a DC side of which is connected to the DC electrical network. The control system may be configured to control the second electrical machine to operate in a generator mode during the time interval when the stator of the first electrical machine is being switched between the star configuration and the delta configuration.

The permanent magnet electrical machine may be a first electrical machine and the additional electrical power source may comprise a second permanent magnet electrical machine. The second permanent magnet electrical machine may comprise a rotor drivingly coupled to a spool of a gas turbine engine and stator windings controllably switchable between a star configuration and a delta configuration. The power and propulsion system may further comprise a second AC:DC power electronics converter, an AC side of which is connected to terminals of windings of the second electrical machine and a DC side of which is connected to the DC electrical network. The control system may be configured to schedule timings for switching the stator windings of each of the first and second electrical machines between the star and delta configurations, the scheduled timings comprising a first time interval for switching the stator windings first electrical machine and a second time interval for switching the stator windings of the second electrical machine, the first and second time intervals being non-overlapping time intervals.

The rotor of the second electrical machine may be drivingly coupled to the spool of the gas turbine engine.

The rotor of the second electrical machine may be drivingly coupled to a second spool of the gas turbine engine.

The aircraft power and propulsion system may further comprise a second gas turbine engine, and the rotor of the second electrical machine may be drivingly coupled to a spool of the second gas turbine engine.

The control system may be further configured to monitor at least one operating condition of the power and propulsion system and to control the switching of the stator windings between the star configuration and the delta configuration based on the at least one operating condition.

The at least one operating condition may be indicative of a terminal voltage at terminals of the stator windings. The at least one operating condition may comprise one or more of: the terminal voltage at the terminals of the stator windings of the electrical machine; a speed of the rotor of the electrical machine; and/or a speed of the spool of the gas turbine engine.

The control system may be configured to: switch the stator windings from the star configuration to the delta configuration in response to an increase in the terminal voltage; and/or switch the stator windings from the delta configuration to the star configuration in response to a decrease in the terminal voltage.

The at least one operating condition may be indicative of an electrical power demand of one or more electrical loads connected to the DC electrical network. The control system may be configured to: switch the stator windings from the delta configuration to the star configuration in response to an increase in the electrical power demand; and/or switch the stator windings from the star configuration to the delta configuration in response to a decrease in the electrical power demand.

The at least one operating condition may be indicative of both a terminal voltage at the terminals of the stator windings of the electrical machine and an electrical power demand of one or more electrical loads connected to the DC electrical network. The control system may be configured to control the switching of the stator windings between the star configuration and the delta configuration based on both the terminal voltage and the electrical power demand.

The aircraft power and propulsion system may comprise a controllable switching arrangement. The switching arrangement may have a first switching state in which the stator windings are in the star configuration and a second switching state in which the stator windings are in the delta configuration. The control system may be configured to control the switching state of the switching arrangement to switch the stator windings between the star configuration and the delta configuration.

The switching arrangement may have a third switching state in which the terminals of the stator windings are connected together. The control system may be further configured to monitor the power and propulsion system for faults and, in response to detecting to a fault, switch the switching arrangement to the third state. The control system may monitor the power and propulsion system for a fault in the DC electrical network or an electrical load connected thereto. The control system may monitor the power and propulsion system for a fault in the AC:DC power electronics converter.

The switching arrangement may comprise a first set of switches and a second set of switches. In the star configuration of the stator windings, the first set of switches may be closed and the second set of switches open. In the delta configuration of the stator windings, the first set of switches may be open and the second set of switches closed. The switches may be contactors (e.g., 3-pole contactors). The switches may be semiconductor switches (e.g., solid state circuit breakers or solid state power controllers (SSPCs)).

The AC:DC power electronics converter may be a passive AC:DC power electronics converter.

In other examples the AC:DC power electronics converter is an active converter. In this case, the control system may be further configured to control a voltage level at the DC side of the AC:DC power electronics converter by controlling the AC:DC power electronics converter to implement one or more of modulation index control, field weakening control or fielding strengthening control.

The electrical machine may be selectively operable as a generator or a motor, in which case the AC:DC power electronics converter may be a bidirectional converter. In other examples, the electrical machine is operable only as a generator and the AC:DC power electronics converter is a rectifier. In other examples still, the electrical machine is operable only as a motor and the AC:DC power electronics converter is an inverter.

The permanent magnet electrical machine may have an impedance of at least 1.0 per-unit.

The rotor of the electrical machine and the spool of the gas turbine engine may be drivingly coupled in a direct drive arrangement, whereby a rotational speed of the rotor and the spool are equal.

The spool with which the rotor of the electrical machine is drivingly coupled may be a high-pressure (HP) spool of a multi-spool gas turbine engine.

The DC network may have a voltage of at least 270 V. The DC network may have a voltage of at least 540 V.

The, or each, gas turbine engine may be a propulsive gas turbine engine. Alternatively, the, or each, gas turbine engine may not be a propulsive gas turbine engine and may instead be, e.g., part a turbogenerator which supplies electrical power to electrical loads including propulsive loads.

According to a second aspect, there is provided an aircraft comprising the aircraft power and propulsion system of the first aspect.

According to a third aspect, there is provided a method of controlling an aircraft power and propulsion system. The power and propulsion system comprises: a gas turbine engine; a DC electrical network; a permanent magnet electrical machine comprising a rotor drivingly coupled to a spool of the gas turbine engine and a stator comprising windings switchable between a star configuration and a delta configuration; and an AC-DC power electronics converter, an AC side of which is connected to terminals of the stator windings of the electrical machine and a DC side of which is connected to the DC electrical network; and an additional electrical power source connected to DC electrical network. The method comprises: switching the stator windings of the permanent magnet electrical machine between the star configuration and the delta configuration during a time interval; supplying electrical power from the additional electrical power source to the DC electrical network during the time interval.

The method may further comprise: scheduling a time interval for the switching of the stator windings between the star configuration and the delta configuration; and prior to a start of the scheduled time interval, reducing an amount of electrical power supplied to the DC electrical network by the permanent magnet electrical machine and increasing an amount of electrical power supplied to the DC electrical network by the additional electrical power source.

The amount of electrical power supplied to the DC electrical network by the permanent magnet electrical machine may be reduced to zero prior to the scheduled time interval.

The additional electrical power source may comprise an electrical energy storage unit (e.g., one or more batteries and/or capacitors). Supplying electrical power from the additional electrical power source to the DC electrical network during the time interval may comprise discharging the electrical energy storage unit during the time interval.

The permanent magnet electrical machine may be a first electrical machine and the additional electrical power source comprises a second electrical machine, the second electrical machine comprising a rotor and stator comprising windings. The power and propulsion system may further comprise a second AC:DC power electronics converter, an AC side of which is connected to terminals of the stator windings of the second electrical machine and a DC side of which is connected to the DC electrical network. The method may further comprise operating the second electrical machine in a generator mode during the time interval when the stator of the first electrical machine is switched between the star configuration and the delta configuration.

The permanent magnet electrical machine may be a first electrical machine and the additional electrical power source may comprise a second permanent magnet electrical machine. The second electrical machine may comprise a rotor drivingly coupled to a spool of a gas turbine engine and a stator comprising windings controllably switchable between a star configuration and a delta configuration. The power and propulsion system may further comprise a second AC:DC power electronics converter, an AC side of which is connected to terminals of the stator windings of the second electrical machine and a DC side of which is connected to the DC electrical network. The method may further comprise: scheduling timings for switching the stator windings of each of the first and second electrical machines between the star and delta configurations, the scheduled timings comprising a first time interval for switching the stator windings first electrical machine and a second time interval for switching the stator windings of the second electrical machine; switching the stator windings of the first electrical machine between the star configuration and the delta configuration during the first time interval; and switching the stator windings of the first electrical machine between the star configuration and the delta configuration during the second time interval, wherein the first and second time intervals are non-overlapping time intervals.

The time interval may be greater than 10 ms. The time interval may be between 10 ms and 100 ms.

The method may comprise operating the gas turbine engine such that a speed range of the spool during non-idle operation is at least 2:1.

The method may comprise controlling a voltage level at the DC side of the AC:DC power electronics converter by controlling the AC:DC power electronics converter to implement one or more of modulation index control, field weakening control or fielding strengthening control.

The method may further comprise: monitoring at least one operating condition of the power and propulsion system; and controlling, based on the at least one operating condition, switching the stator windings of the electrical machine between the star configuration and the delta configuration.

The at least one operating condition may be indicative of a terminal voltage at the terminals of the stator windings of the electrical machine and/or an electrical power demand of one or more electrical loads connected to the DC electrical network.

Controlling the switching of the stator windings of the electrical machine between the star configuration and the delta configuration may comprise: switching the stator windings from the star configuration to the delta configuration in response to an increase in the terminal voltage at the terminals of the stator windings and/or a decrease in the electrical power demand; and/or switching the stator windings from the delta configuration to the star configuration in response to a decrease in the terminal voltage at the terminals of the stator windings and/or an increase in the electrical power demand.

The system may further comprise a switching arrangement having a first switching state in which the stator windings are in the star configuration and a second switching state in which the stator windings are in the delta configuration. Controlling the switching of the stator windings of the electrical machine between the star configuration and the delta configuration may comprise controlling the switching state of the switching arrangement.

The switching arrangement may have a third switching state in which the terminals of the stator windings are connected together. The method may further comprise: monitoring the DC electrical network for faults; and responsive to the detecting a fault in the DC electrical network, switching the switching arrangement to the third state.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DETAILED DESCRIPTION

Figure 1:
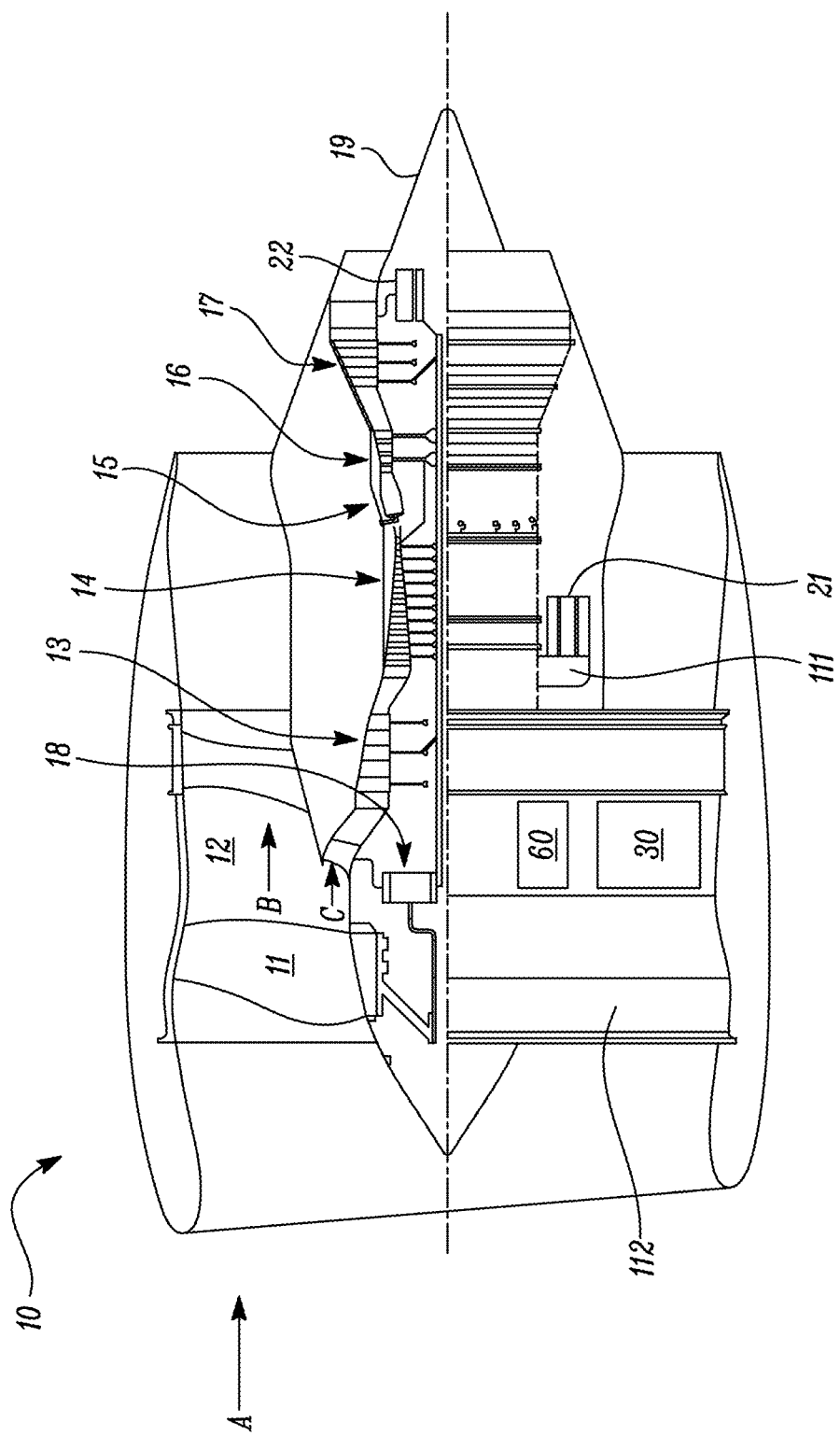
FIG. 1 is a sectional side view of a gas turbine engine.

FIG. 1 shows a general arrangement of an engine 10 for an aircraft. The engine 10 is of turbofan configuration, and thus comprises a ducted fan 11 that receives intake air A and generates two pressurised airflows: a bypass flow B which passes axially through a bypass duct 12 and a core flow C which enters a core gas turbine.

The core gas turbine comprises, in axial flow series, a low-pressure compressor 13, a high-pressure compressor 14, a combustor 15, a high-pressure turbine 16, and a low-pressure turbine 17.

In operation, the core flow C is compressed by the low-pressure compressor 13 and is then directed into the high-pressure compressor 14 where further compression takes place. The compressed air exhausted from the high-pressure compressor 14 is directed into the combustor 15 where it is mixed with fuel and the mixture is combusted. The resultant hot combustion products then expand through, and thereby drive, the high-pressure turbine 16 and in turn the low-pressure turbine 17 before being exhausted to provide a small proportion of the overall thrust.

The high-pressure turbine 17 drives the high-pressure compressor 14 via an interconnecting shaft. The low-pressure turbine 17 drives the low-pressure compressor 13 via another interconnecting shaft. Together, the high-pressure compressor 14, high-pressure turbine 16, and associated interconnecting shaft form part of a high-pressure spool of the engine 10. Similarly, the low-pressure compressor 13, low-pressure turbine 17, and associated interconnecting shaft form part of a low-pressure spool of the engine 10. Such nomenclature will be familiar to those skilled in the art. Those skilled in the art will also appreciate that whilst the illustrated engine has two spools, other gas turbine engines have a different number of spools, e.g., three spools.

In this example the fan 11 is driven by the low-pressure turbine 17 via a reduction gearbox in the form of a planetary-configuration epicyclic gearbox 18. Thus, in this configuration, the low-pressure turbine 17 is connected with a sun gear of the gearbox 18. The sun gear is meshed with a plurality of planet gears located in a rotating carrier, which planet gears are in turn meshed with a static ring gear. The rotating carrier drives the fan 11 via a fan shaft. It will be appreciated that in alternative embodiments a star-configuration epicyclic gearbox (in which the planet carrier is static and the ring gear rotates and provides the output) may be used instead, and indeed that the gearbox 18 may be omitted entirely so that the fan 11 is driven directly by the low-pressure turbine 17. In three-spool engines the turbine may comprise three stages, in which case the fan may be driven by the lowest pressure of three turbines.

It is increasingly desirable to facilitate a greater degree of electrical functionality on the airframe and on the engine. To this end, the engine 10 of FIG. 1 comprises one or more rotary electrical machines, generally capable of operating both as a motor and as a generator. The number and arrangement of the rotary electrical machines will depend to some extent on the desired functionality. Some embodiments of the engine 10 include a single rotary electrical machine 21 driven by the high-pressure spool, for example by a core-mounted accessory drive 111 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 21 coupled with the high-pressure spool and a second rotary electrical machine 22 coupled with the low-pressure spool. In addition to generating electrical power and the starting the engine 10, having both first and second rotary machines 21, 22, connected by power electronics, can facilitate the transfer of mechanical power between the high and lower pressure spools to improve operability, fuel consumption etc.

As mentioned above, in FIG. 1 the first rotary electrical machine 21 is driven by the high-pressure spool by a core-mounted accessory drive 111 of conventional configuration. In alternative embodiments, the first electrical machine 21 may be mounted coaxially with the turbomachinery in the engine 10. For example, the first electrical machine 21 may be mounted axially in line with the duct between the low- and high-pressure compressors 13 and 14. In FIG. 1, the second electrical machine 22 is mounted in the tail cone 19 of the engine 10 coaxially with the turbomachinery and is coupled to the low-pressure turbine 17. In alternative embodiments, the second rotary electrical machine 22 may be located axially in line with low-pressure compressor 13, which may adopt a bladed disc or bladed drum configuration to provide space for the second rotary electrical machine 22. It will of course be appreciated by those skilled in the art that any other suitable location for the first and (if present) second electrical machines may be adopted.

The first and second electrical machines 21, 22 are connected with power electronics. Extraction of power from or application of power to the electrical machines is performed by power electronics converters 30. In the present embodiment, the power electronics converters 30 are mounted on the fan case 112 of the engine 10, but it will be appreciated that it may be mounted elsewhere such as on the core of the gas turbine, or in the vehicle to which the engine 10 is attached, for example.

Control of the power electronics converters 30 and of the first and second electrical machines 21 and 22 is in the present example performed by an engine electronic controller (EEC) 60. In the present embodiment the EEC 60 is a full-authority digital engine controller (FADEC), the configuration of which will be known and understood by those skilled in the art. It therefore controls all aspects of the engine 10, i.e., both of the core gas turbine and the first and second electrical machines 21 and 22. In this way, the EEC 60 may holistically respond to both thrust demand and electrical power demand.

The one or more rotary electrical machines 21, 22 and the power electronics converters 30 may be configured to output to or receive electric power from one, two or more DC busses or power channels. The DC power channels allow for the distribution of electrical power to other engine electrical loads and to electrical loads on the airframe.

Those skilled in the art will appreciate that the gas turbine engine 10 described above may be regarded as a 'more electric' gas turbine engine because of the increased role of the electrical machines 21, 22 compared with those of conventional gas turbines.

Figure 2:
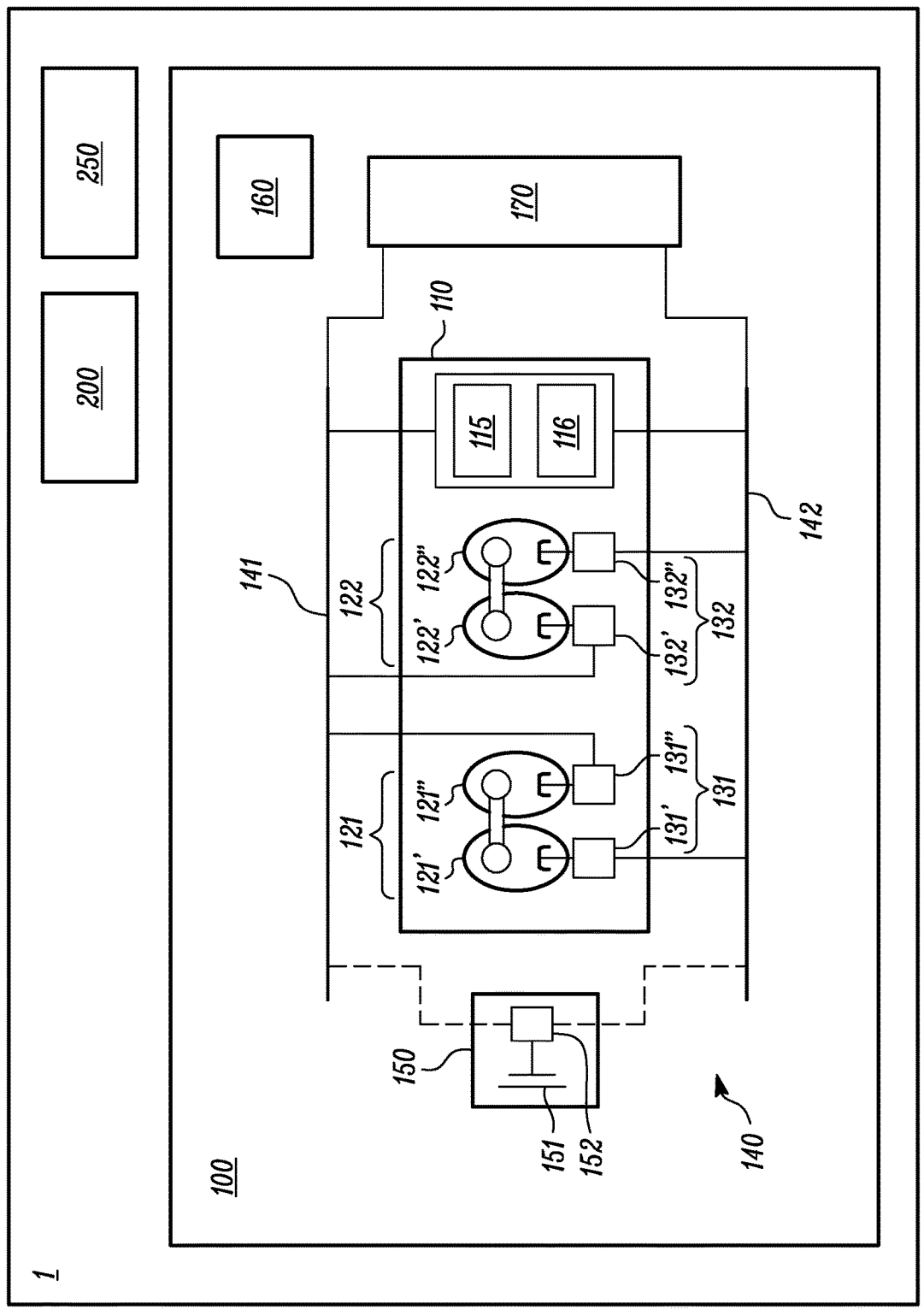
FIG. 2 is a schematic illustration of an aircraft with a single-engine power and propulsion system.

FIG. 2 is a schematic illustration of an aircraft 1 which includes a power and propulsion system 100.

The power and propulsion system 100 includes a propulsive gas turbine engine 110. The engine 110 has two spools: a first spool, which in this case is a high-pressure spool having high-pressure compressor 14; a high-pressure turbine 16; and an interconnecting shaft, and a second spool, which in this case is a low-pressure spool having a fan 11, a low-pressure compressor 13; a low-pressure turbine 17; and an interconnecting shaft. The engine could alternatively be of the three-spool type and/or could include a gearbox as described above with reference to FIG. 1. The engine 110 may be of the low- or high-bypass turbofan type or another type, for example the open rotor type.

In this embodiment the propulsive gas turbine engine 110 includes two electrical machines 121, 122: a first electrical machine 121 mechanically coupled with its first spool and a second electrical machine 122 coupled with its second spool. In this example each of the machines 121, 122 is operable as both a motor and as a generator. Thus, each machine 121, 122 can either drive rotation of its spool or extract mechanical power from its spool and generate electrical power therefrom. In other examples, one or both electrical machines 121, 122 may only be operable as a generator or only operable as a motor.

In a preferred embodiment one or both of the electrical machines 121, 122 are coaxially coupled with the shafts of the spools and embedded within the core of the engine 110. The electrical machines 121, 122 could, however, be coupled with the spools in another manner, for example through an auxiliary gearbox in a conventional manner, for example using a radial/tower shaft arrangement, as discussed above with reference to FIG. 1.

In this embodiment each electrical machine 121, 122 comprises two sub-machines: the first electrical machine 121 comprises a first sub-machine 121' and a second sub-machine 121"; and the second electrical machine 122 comprises a first sub-machine 122' and a second sub-machine 122". The term "sub-machine" will be understood to refer to one of a plurality of functionally separate electrical machines which are physically integrated together to some extent. For example, the electrical machine 121 may be a dual-wound machine having a single, common rotor and a single stator structure featuring two independent sets of stator windings, with the two independent sets of windings forming the two sub-machines 121', 121". Alternatively, each of the two sub-machines 121', 121" may have its own stator and its own rotor axially spaced part from the rotor and stator of the other sub-machine, with some common structure such as a common casing or mounting arrangement. Other sub-machine arrangements will occur to those skilled in the art. The overall power rating of each electrical machine is preferably equally or approximately equally split between its two sub-machines, though this need not necessarily be the case: a split of 40-60% and 60-40% could be used, for example.

Each electrical machine 121, 122 can, in principle, be of any suitable type known in the art. In accordance with embodiments described herein, at least one and optionally each machine 121, 122 is of the permanent magnet type, but induction or switched-reluctance machines could also be used, for example. The machines 121, 122 are preferably of the radial flux or transverse flux type, but other arrangements could be used.

The power and propulsion system 100 further includes a DC electrical network 140. The DC electrical network 140 includes one or more electrical distribution busses 141, 142 (which may also be called power channels) which are electrically connected with the electrical machines 121, 122 of the engine 110. In this way, electrical power can be received from, delivered to and transferred between the electrical machines 121, 122.

The DC electrical network 140 interfaces with the electrical machines 121, 122 through AC:DC power electronics converters 131, 132. Specifically, the first electrical machine 121 has a first set of bidirectional AC:DC converters 131, including a first converter 131' for its first sub-machine 121' and a second converter 131" for its second sub-machine 121". Likewise, the second electrical machine 122 has a second set of bidirectional AC:DC converters 122, including a third converter 132' for its first sub-machine 122' and a fourth converter 132" for its second sub-machine 122". Any suitable AC:DC converter topology may be used, for example two-level converters with half-bridges or H-bridges, possibly accompanied by appropriate filters.

In the illustrated embodiment, the DC-sides of the AC:DC converters 131, 132 are connected with the DC busses 141, 142 so as to provide re-configurability and fault tolerance, in addition to simultaneous dual-spool power generation. Specifically, since each electrical machine 121, 122 comprises two sub-machines, each electrical machine can be connected with each of the two busses 141, 142. The first sub-machine 121' of the first electrical machine 121 is connectable with the first DC bus 141, the second sub-machine 121" of the first electrical machine 121 can be connected with the second DC bus 142, the first sub-machine 122' of the second electrical machine 122 can be connected with the first DC bus 141, and the second sub-machine 122" of the second electrical machine 122 can be connected with the second DC bus 142.

Through the electrical system 140, the power and propulsion system 100 provides electrical power to various electrical loads distributed about the engine 110 and the aircraft platform 1. Platform electrical loads 170 may include, for example, one or more of: lighting, cabin environmental control systems such as heating systems, wing anti-icing systems, various actuators and the like. The engine electrical loads 115, 116 may include an electrically powered fuel pump 115. Other engine electrical loads 116 may include, for example, an electric nacelle anti-icing system, an electrically powered oil pump, or an electric cabin blower system.

The power and propulsion system 100 further includes an energy storage system (ESS) 150. In preferred embodiments the ESS 150 takes the form of a rechargeable battery pack or module 151, formed from lithium-ion cells or cells of another suitable type. As illustrated by the dashed lines, the ESS is connected with the electrical system 140, possibly via a DC-DC power electronics converter 152 for conditioning the power and matching it to voltage of DC electrical system. In this embodiment it can be seen that the ESS 150 is connected with each of the DC distribution busses 141, 142.

The ESS 150 may be used as an electrical power source or sink for a variety of different purposes. For example, the ESS 150 may provide power to, or sink power from, the spool-coupled electrical machines 121, 122 in order to manage the surge margin of engine, especially during engine transients such as accelerations and decelerations. The ESS 150 may also be used to power one or more of the electrical machines 121, 122 as part of an electric start procedure. In some embodiments described herein, the ESS 150 provides electrical power to the DC network 140 during a time interval where the stator of one or more of the electrical machines 121, 122 or sub-machines 121', 121", 122', 122" thereof is switched between a star configuration and a delta configuration.

The aircraft 1 may further include an Auxiliary Power Unit (APU) 200. In some embodiments, one or more electrical machines (not shown) driven by the APU 200 are used as an electrical power source to replace or supplement the power provided by the ESS 150 during an electric start of the engine 110. In other embodiments, however, the APU 200 may not be used for this purpose or may be entirely omitted from the aircraft 1 to reduce weight. In some instances, for example where the ESS 150 is insufficiently charged and the APU is omitted or unable to provide power, a ground cart may be used to provide electrical power to start the engine 110.

The aircraft may also further include a Ram Air Turbine (RAT) 250 or other emergency source of electrical power. In case of a loss of electrical power, the RAT 250 may be deployed, for example to charge the ESS 150 to allow an inflight restart attempt. In preferred embodiments, however, the RAT 250 may be omitted entirely to reduce aircraft weight, with the ESS 150 providing sufficient engine restart capability. In some embodiments a portion of the ESS 150 may be dedicated to providing electrical power during restart attempts so that the capability is always available. Additionally or alternatively a state of charge of the ESS 150 may be maintained above a threshold level so that the capability is always available.

The power and propulsion system 100 further includes a control system 160. The control system 160, which can take any suitable form including an EEC or FADEC and may include one or more controllers and/or one or more functional modules, provides control of the engine 110, including the fuel pump 115 and the electrical machines 121, 122; and the electrical system 140, including the ESS 150 and the power electronics 131, 132, 152. The control system 160 may, amongst other things, control: the configuration of the electrical system 140; the modes in which the electrical machines 121, 122 of the engine 110 operate; the delivery of fuel into the combustion equipment 16 of the engine 110; the mode of operation of the ESS 150, the APU 200 and/or the RAT 250; and parameters of the power electronics (e.g., switching frequencies and duty cycles of the semiconductor switches).

Figure 3:
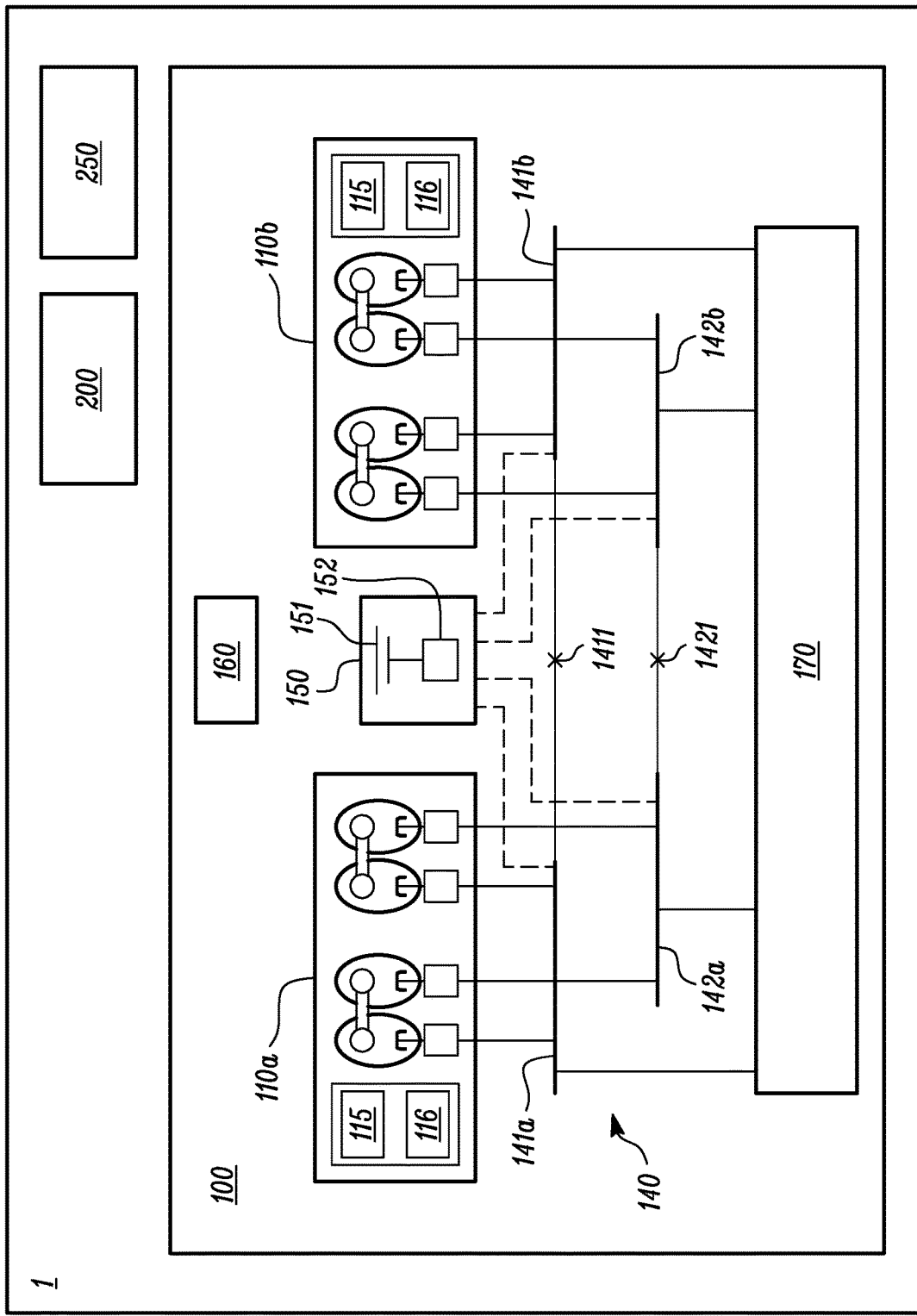
FIG. 3 is a schematic illustration of an aircraft with a twin-engine power and propulsion system.

FIG. 3 is a schematic illustration of an aircraft 1 with a power and propulsion system 100. The power and propulsion system 100 is substantially the same as that of FIG. 2, except that it includes two propulsive gas turbine engines 110a, 110b instead of one.

In the illustrated embodiment, the DC busses 141a, 142a associated with the first engine 110a are electrically connected with the DC busses 141b, 142b associated with the second engine 110b, optionally via selectively openable and closable bus ties 1411, 1421. This allows electrical power generated by the electrical machines 121, 122 of one engine (e.g., engine 110a) to be transferred to the other engine (e.g., engine 110b). This generally increases fault tolerance in the power generation system, and allows, for example, critical loads associated with the second engine 110b (e.g., its fuel pump 115) to be powered by electrical power generated by the first engine 110a in the event of a partial or total loss of electrical power generation in the second engine 110b.

Various modifications and alternatives to the specific embodiments illustrated in FIGS. 2 and 3 will occur to those skilled in the art. For example:

i. Although only single-engine and twin-engine platforms are illustrated, an aircraft could have more than two (e.g., four) propulsive gas turbine engines.

ii. In the illustrated embodiments, the full power of each electrical machine 121, 122 is split between two sub-machines 121', 121"; 122', 122". This need not be the case: each electrical machine 121, 122 may be a single, larger electrical machine of the full power rating. This may however reduce the fault-tolerance of the platform, and in particular may prevent cross-engine electric starting and restarting in the presence of one or more faults, for example a non-critical fault resulting in a partial or full loss of one or more of the electrical machines.

iii. In principle each electrical machine 121, 122 could have more than two (e.g., three or four) sub-machines, but the number will in practice be limited by space constraints.

iv. Whilst dual spool power generation is preferred, only one of the spools of the engine 110 may be provided with an electrical machine in other embodiments. In other words, one of electrical machine 121 and electrical machine 122 may be omitted.

v. Whilst the illustrated embodiment has two DC busses 141, 142 per engine 110, fewer than two (i.e., one) or more than two DC busses could be provided. The use of a single bus would reduce fault tolerance compared with two busses. The use of more than two busses could increase fault tolerance but at the cost of increased system weight and complexity.

vi. Whilst a battery is illustrated, the ESS 150 could take another form. It could, for example, additionally or alternatively include one or more supercapacitors. One or more fuel cells could also be used, though batteries are preferred.

Figure 4:
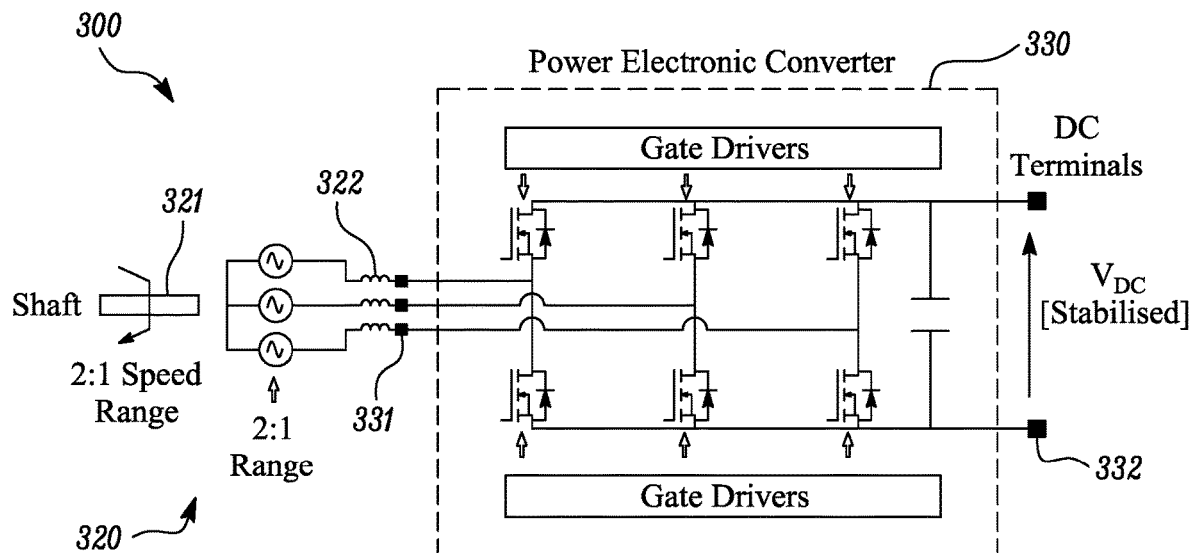
FIG. 4 is a schematic illustration of a conventional permanent magnet electrical machine connected to a DC electrical network via an AC:DC power electronics converter.

FIG. 4 illustrates a portion 300 of a power and propulsion system of an aircraft. The portion 300 may form a part of a power and propulsion system 100 of the types shown in FIGS. 2 and 3, however other suitable system arrangements are known and will occur to those skilled in the art.

The system portion 300 includes a permanent magnet electrical machine 320 and an AC:DC power electronics converter 330. The rotor 321 of the electrical machine 320 is drivingly connected to a shaft of an engine (e.g., a shaft of an LP, IP or HP spool of a gas turbine engine). The AC-side 331 of the converter 330 is connected to the terminals of the stator windings 322 of the electrical machine 320. The DC-side 332 of the converter 330 is connected to a DC electrical network (e.g., DC electrical network 140 in FIGS. 2-3).

In the illustrated example the electrical machine 320 is a three-phase machine and the AC:DC converter 330 is of the two-level, three-phase type and comprises three half-bridges. It will however be appreciated that other numbers of phases (e.g., four) and other converter circuits (e.g., one H-bridge per phase) are equally possible.

The engine whose shaft is connected to the rotor 321 of the electrical machine 320 provides propulsive power. Normal operation of the system 300 will therefore involve a relatively high rotor speed range. For example, the ratio of the speed of the shaft during a maximum take-off operating condition divided by the speed of the shaft during a descent operating condition may be 2:1 or more. Thus, being a permanent magnet electrical machine with no or limited excitation at the rotor, the stator terminal voltage which interfaces with the AC-side of the converter 330 may also vary by a factor of about 2:1 or more. This is because the back EMF of a permanent magnet machine changes in direct proportion to the rotor rotational speed (though it is noted that the magnitude of the voltage at the AC terminals is further affected by the current flow through the impedance of the generator, i.e., there is a regulation impact too).

Figure 5:
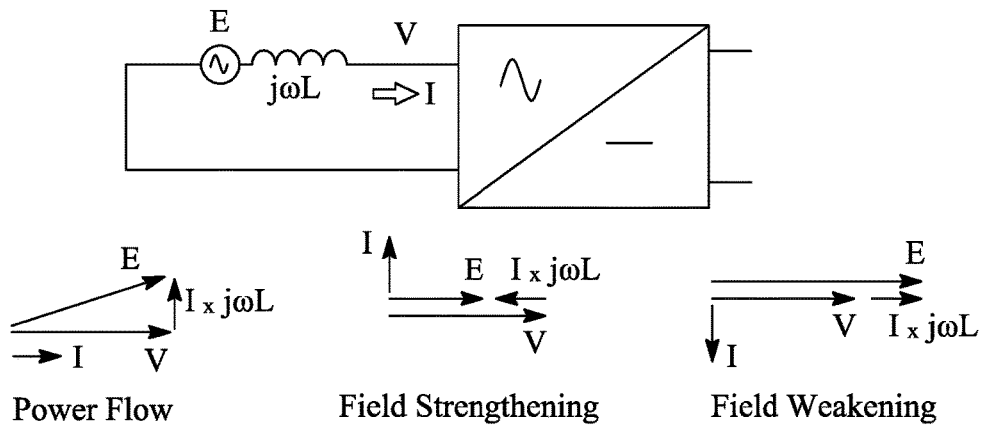
FIG. 5 illustrates how field strengthening, field weakening and modulation index control may be used to control the voltage level at the DC-side of an AC:DC power electronics converter.
Figure 5:
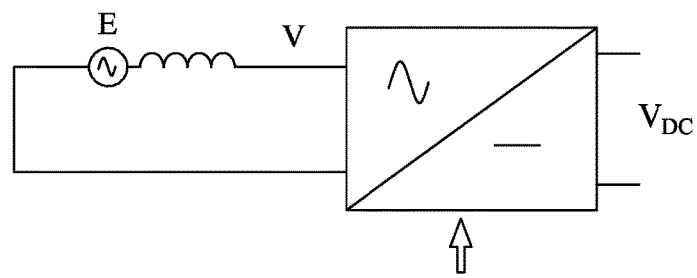

Consequently, to provide a stable DC voltage at the DC-side 332 of the converter 330, the converter 330 should be capable of operating with an input AC voltage range of, e.g., 2:1. This is generally achieved through one or a combination of active control of the transistor switching pattern (i.e., modulation index control) and field strengthening and/or field weakening. Modulation index control and field strengthening/weaking, illustrated in FIG. 5, will be familiar to those skilled in the art.

Modulation index control changes the ratio of DC to AC voltage produced by the converter by changing the applied switching pattern (i.e., the time when each transistor is switched on and off). It aims to better control the AC terminal voltage to match that of the varying back EMF of the generator, taking account of the regulation effects caused by current flow. The voltage control aims to produce a relatively clean sinusoidal voltage at the AC terminals of the converter with low harmonic content. In many applications $3^{rd}$ harmonic zero-phase sequence modulation of the voltage waveform is also applied to optimise the DC:AC side voltage ratio.

Field weakening and field strengthening work by controlling the power electronic converter to draw additional reactive (leading or lagging) current from the machine. In the field strengthening case, the converter draws an additional reactive current which is 90 degrees in advance of the converter AC terminal voltage (V) which has the effect of increasing the AC terminal voltage above that of the internal EMF (E). The opposite effect occurs during field-weakening when the converter draws an additional current that is 90 degrees behind the converter AC terminal voltage. With both field weak-strengthening and field-weakening control, the converter and machine have to tolerate the additional reactive current required to deliver a more stabilised AC terminal voltage magnitude to the AC:DC converter. This additional current does not contribute to the useful power transferred to the DC network and leads to additional heating in both the converter and machines. In other words, using these control methods means that some of the current capacity of the system is wasted.

If the magnitudes of the AC and DC voltages were relatively small, the requirement that the converter 330 can operate over a 2:1 range would not carry a significant penalty. However, the magnitude of the DC voltage commonly used in aerospace electrical systems is relatively high at 270 V. Furthermore, with the trend towards 'more electric' aircraft power and propulsion systems, it may be desirable to increase the distribution voltage to facilitate higher power loads, with 540 V (or ±270 V) a candidate for a higher aerospace voltage magnitude. At these voltages, a converter 330 with power semiconductors rated for an input voltage range of about 2:1 may carry a significant weight penalty or be impractical (from a safety and certification perspective, for example) due to the high current magnitudes which would be involved. An alternative would be to size the electrical machine for high-speed operation and to use a converter which is not capable of operating over the entire 2:1 voltage range, but this would result in a variation in the DC voltage level at lower-speed operation and thereby limit the amount of power available to the DC electrical network at lower-speed operation. Another alternative would be to size the electrical machine for low-speed operation. This, however, would result in a high AC-side voltage at high-speed operation and result in high on-state power losses in the converter 330.

Figure 6:
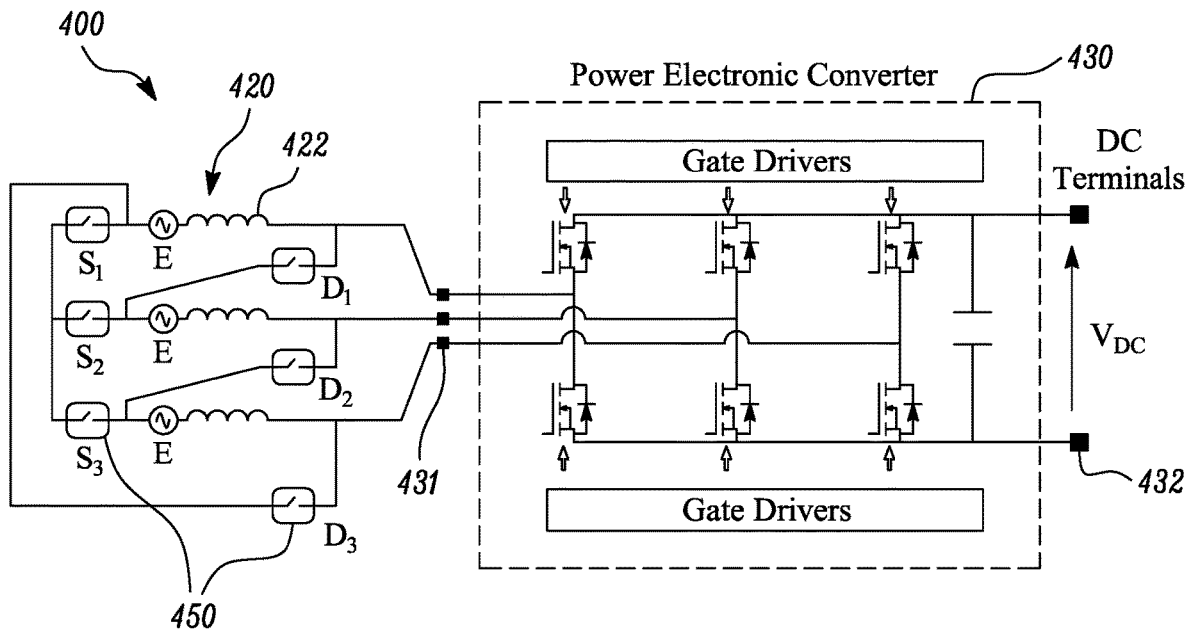
FIG. 6 is a schematic illustration of a permanent magnet electrical machine whose stator windings are controllably switchable between a star configuration and a delta configuration connected to a DC electrical network via an AC:DC power electronics converter.

FIG. 6 illustrates a portion 400 of an electrical power and propulsion system in accordance with the present invention. Like the system 300 of FIG. 4, the system 400 of FIG. 6 includes a permanent magnet electrical machine 420 and an AC:DC power electronics converter 430. The electrical machine 420 has a rotor (not shown in FIG. 6) drivingly connected to a shaft of an engine (e.g., a shaft of an LP, IP or HP spool of a gas turbine engine) and thus has a relatively high speed range. The AC-side 431 of the converter 430 is connected to the terminals of the stator windings 422 of the electrical machine 420. The DC-side 432 of the converter 430 is connected to a DC electrical network. As before, three-phases and a two-level converter with half-bridges are illustrated but this is not intended to be limiting.

Figure 7:
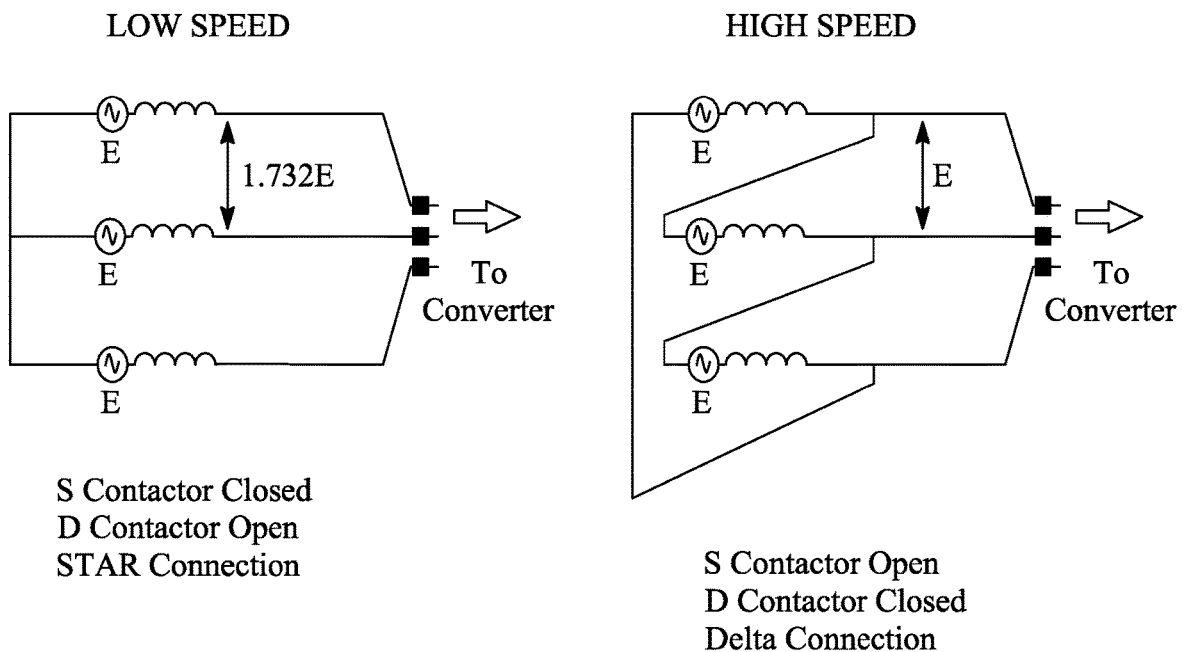
FIG. 7 illustrates the star and delta configurations of the stator windings.

The stator 422 of the permanent magnet electrical machine 420 is switchable between a first configuration in which the windings 422 are connected in a star configuration (also known in the art as a Y- or Wye-configuration) and a second configuration in which the windings are connected in a delta configuration. To this end, the system 400 includes a switching arrangement 450 which can be controlled by a controller (e.g., EEC 160 in FIGS. 2-3). In a first switching state of the switching arrangement 450, the stator 422 is connected in the star configuration (see the left-hand side of FIG. 7). In a second switching state of the switching arrangement 450, the stator 422 is connected in the delta configuration (see the right-hand side of FIG. 7).

In the illustrated embodiment, the switching arrangement 450 is comprised in the permanent magnet electrical machine 420 and comprises two sets of contactors: a first set $S_{1-3}$ and a second set $D_{1-3}$. Closing the first set of contactors $S_{1-3}$ and opening the second set of contactors $D_{1-3}$ places the stator 422 in the star configuration. Opening the first set of contactors $S_{1-3}$ and closing the second set of contactors $D_{1-3}$ places the stator 422 in the delta configuration.

It will be appreciated that the switching arrangement 450 could alternatively be located outside of the electrical machine 420. The switching arrangement 450 could also use any suitable contactor arrangement (e.g., in FIG. 6, two 3-pole contactors or six 1-pole contactors) or a different type of switch in place of the contactors (e.g., semiconductor switches such as solid-state circuit breakers or SSPCs). Furthermore, a switching arrangement 450 comprising switches connected in a different manner to that shown in FIG. 6 could be used implement the same stator switching functionality.

Figure 8:
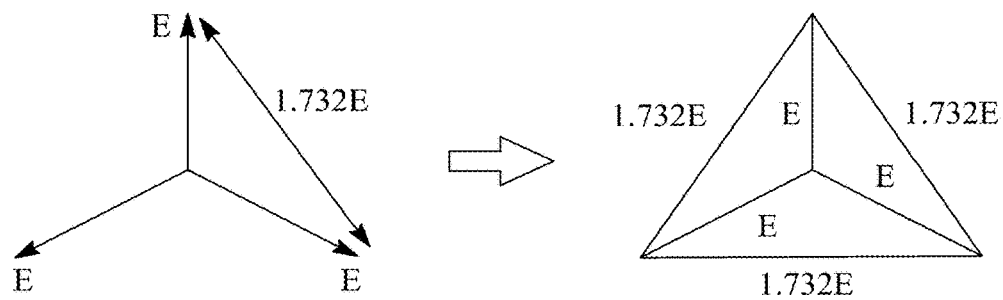
FIG. 8 is a vector diagram illustrating how reconfiguration of the stator windings from the star configuration to the delta configuration changes the stator terminal voltage.

FIG. 8 is a vector diagram illustrating the effect of switching the stator windings 422 from the star configuration to the delta configuration. The alternating voltage presented at the stator terminals of the electrical machine 420 is reduced by a factor of √3 (equal to about 1.732). This is similar to the 2:1 speed range and the associated range in the AC-side voltage. Thus, in accordance with some embodiments described herein, the AC-side voltage is controlled by switching the stator windings 422 between the star configuration and the delta configuration according to an operating condition of the power and propulsion system.

In one example, the stator windings 422 are switched from the star configuration to the delta configuration in response to an increase in the speed of the rotor of the electrical machine 420. Likewise, the stator windings 422 are switched from the delta configuration to the star configuration in response to a decrease in the speed of the rotor of the electrical machine 420. For instance, if the speed of the rotor passes a speed threshold or changes (i.e., accelerates or decelerates) at a threshold rate, the configuration of the stator windings 422 may be changed. In this way, it is possible to prevent an undesirably high AC-side voltage at high rotor speeds and an undesirably low AC-side voltage at low rotor speeds. In other words, for a given converter current rating, the voltage boost provided by the star configuration compared with delta configuration increases the power that can be delivered to the DC electrical network 140 at low-speed conditions.

It should be appreciated that an operating condition other than the electrical machine rotor speed may be used to determine when to change the configuration of the stator windings 422. For example:

A speed of rotation of the engine shaft to which the rotor is connected may be used in place of the speed of rotation of the rotor. Where a direct drive arrangement is used, these speeds will be the same. Where an auxiliary drive arrangement is used, the speed of the rotor will be a predefined gear ratio of the shaft speed.

A speed of a different shaft may be used. Generally, as the speed of one gas turbine spool (e.g., the HP spool) increases or decreases, the speed of the other spool(s) (e.g., the LP or IP spool) will also increase or decrease. For the same reason, the speed of rotation of a rotor of another electrical machine of the power and propulsion system may be used.

The stator terminal voltage may be used. As noted previously, this voltage changes in proportion to the rotor speed. The voltage may be measured, derived or predicted by a model.

Another suitable electrical parameter may be used. For example, a voltage measured elsewhere in the electrical machine may be used, as may a voltage, current or control value of the power electronics converter 430.

Some other parameter indicative of a change in rotor speed, or an expected change in rotor speed, may be used. For example, an engine throttle lever angle or change in throttle lever angle may be indicative of change or upcoming change in rotor speed.

In another example, the stator windings 422 are switched from the delta configuration to the star configuration in response to an increase in an electrical power demand of loads connected to the DC electrical network. Likewise, the stator windings 422 are switched from the star configuration to the delta configuration in response to a decrease in the electrical power demand. For instance, if the electrical power demand passes a power threshold or changes at a threshold rate, the configuration of the stator windings 422 may be changed. In this way, regardless of the rotor speed, it is possible to operate the power electronics converter 430 at a lower voltage associated with lower losses until such a time that the electrical power demand necessitates a higher voltage. This may be particularly advantageous in platforms which utilize intermittent electrical loads, for example certain actuators and/or electrically powered anti-icing systems. The electrical power demand may be measured or predicted in any number of ways and various possibilities will occur to those skilled in the art.

In other examples still, both the electrical power demand and an operating condition indicative of the rotor speed (or stator terminal voltage) of the electrical machine 420 may be used as inputs to determine when to switch the stator windings 422 between the star and delta configurations. For example, the EEC 160 may store look-up tables or a model for selecting a switching configuration based on instantaneous or predicted values of the electrical power demand and e.g., rotor speed.

In FIG. 6, the AC:DC power electronics converter 430 is an active converter. In other words, controllable gate driver circuits can adjust the switching frequency and pattern of the power semiconductors of the converter 430. This allows for the implementation of modulation index control and field strengthening/weakening to adjust the ratio between the magnitudes of the AC-side and DC-side voltages. Thus, there are multiple levers for controlling the voltage: the switching of the stator windings 422 between the star and delta configurations provides a coarse voltage control whilst active control of the converter 430 provides finer control of the voltage level. This may allow for system optimization for a reduced current rating, increased efficiency, reduced size and weight, and cost benefits.

Figure 9:
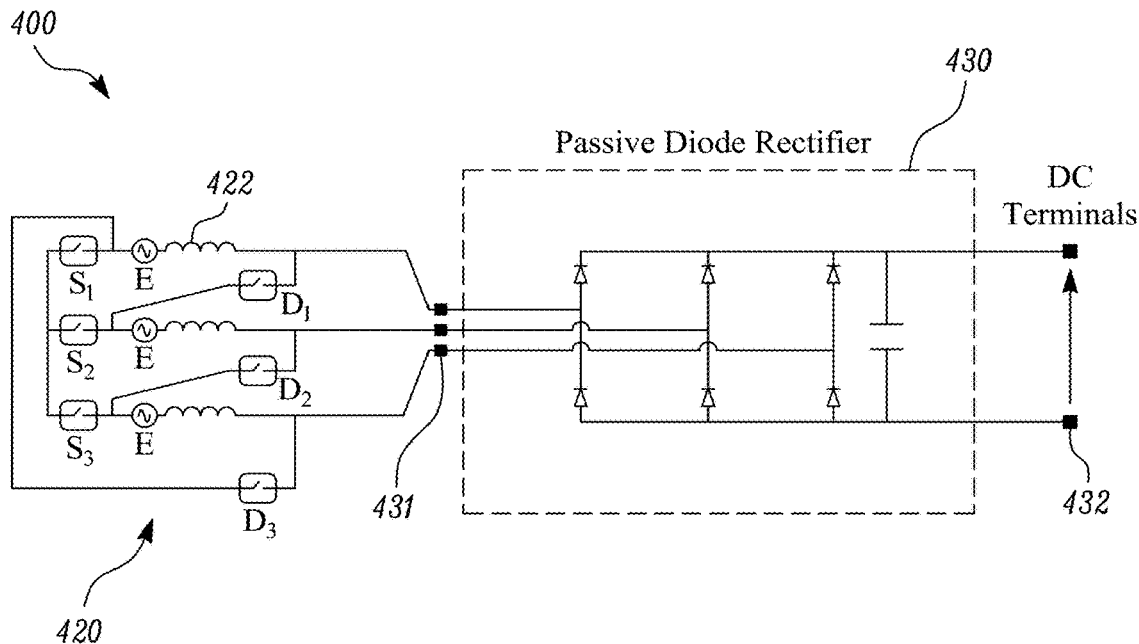
FIG. 9 is a schematic illustration of the star-delta reconfigurable permanent magnet electrical machine connected to a DC electrical network via a passive, diode-based, AC:DC power electronics converter.

FIG. 9 illustrates an alternative embodiment in which the AC:DC power electronics converter 430 is a passive rectifier, for example a diode rectifier. The use of a passive converter in the arrangement of FIG. 4 would be undesirable because the resulting DC-side voltage would be subject to the same high range as the AC-side voltage. In FIG. 9, however, the stator windings 422 are reconfigurable between the star and delta configurations meaning that the DC-side voltage range can be limited even in the absence of active control of the power semiconductors. The use of a passive converter may be associated with a reduction in control complexity, component count and weight.

Figure 10:
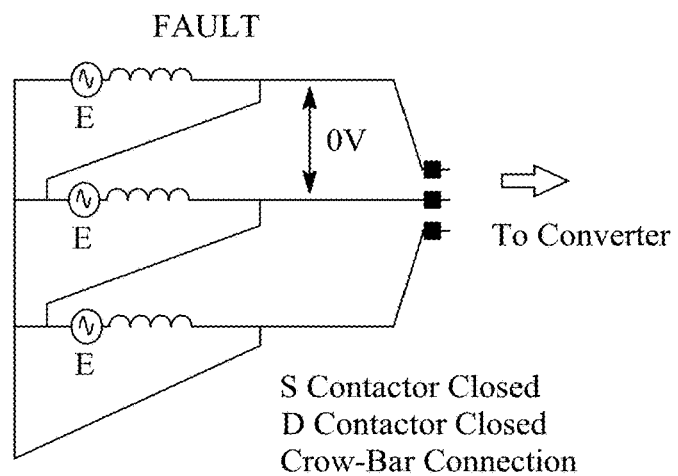
FIG. 10 illustrates a third switching state in which the AC terminals of the stator are joined together and effectively short circuited.

FIG. 10 illustrates an optional third switching configuration of the stator windings 422 in which the stator terminals are joined together and effectively short circuited. Referring again to FIG. 6, this may be achieved by closing both sets of contactors $S_{1-3}$, $D_{1-3}$ of the switching arrangement 450. This switching configuration—referred to in FIG. 10 as the crow-bar connection—may be used in response to the detection (e.g., by the EEC 160 or another element of the control system) of a fault in the DC network 140 or in the AC:DC converter 430. The crow-bar mode removes the voltage from the AC terminals of the AC:DC converter and prevents the electrical machine 420, when operating as a generator, from supplying current to the fault.

Although this mode of operation could lead to high levels of current flowing in the electrical machine 420 and the e.g., contactors $S_{1-3}$, $D_{1-3}$ of the switching arrangement 450, it is common to design the permanent magnet machine 420 to have a high impedance (e.g., 1.0 per-unit or more). This would naturally limit the short-circuit current to a relatively safe magnitude that could be sustained continuously. Furthermore, it is advantageous that this approach caters to the condition where the converter 430 is itself faulty. This is in contrast with the converter-based approaches to fault management described in UK Patent Application Nos. 2115015.6 and 2115016.4, subsequently published as EP 4170881 A1 and EP 4170893 A1, both of which are assigned to the present applicant. The entire contents of both are incorporated herein by reference.

Figure 11:
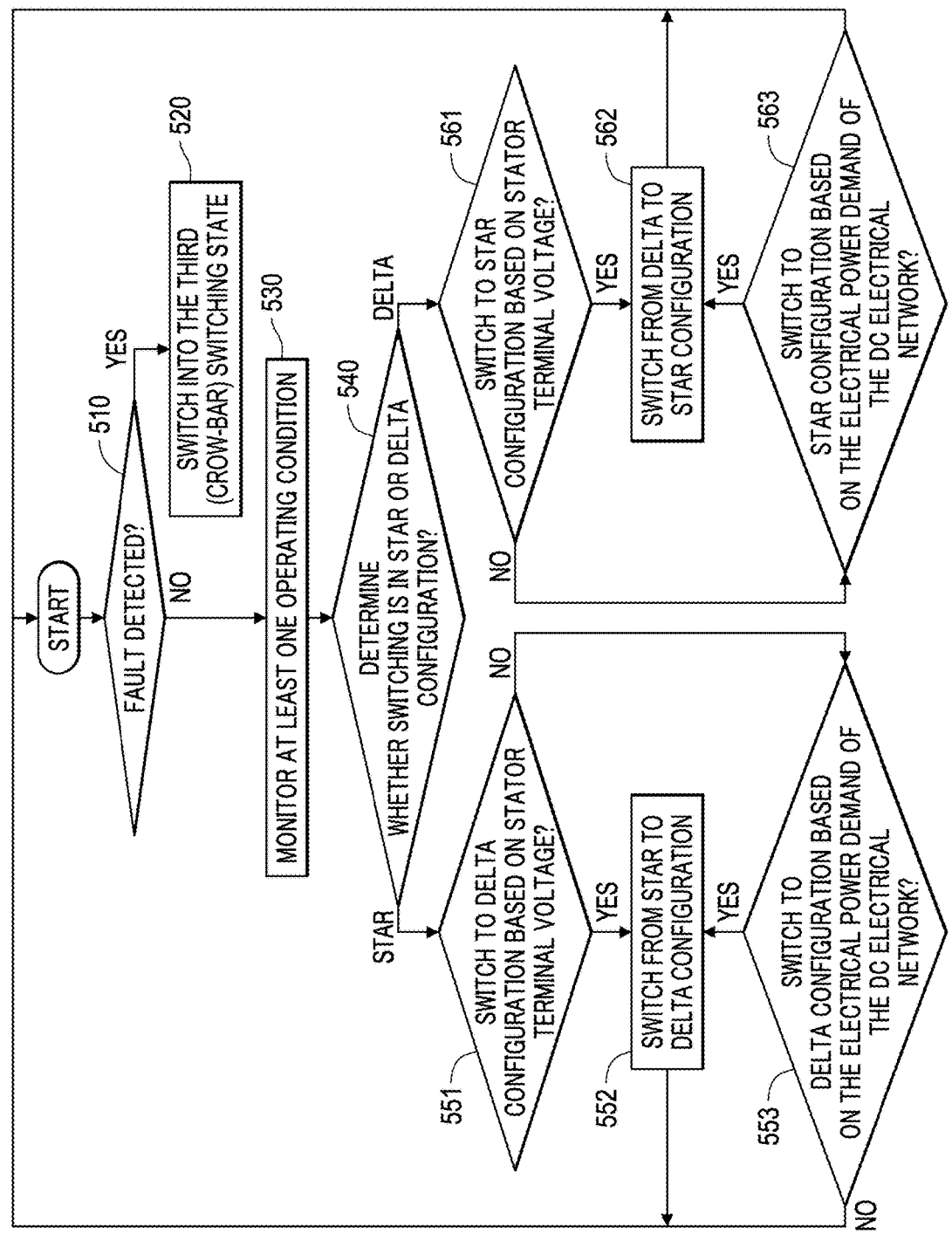
FIG. 11 is a flow chart illustrating a method of operating an aircraft power and propulsion system.

FIG. 11 is a flow chart illustrating a method 500 of operating an aircraft power and propulsion system (e.g., the systems 10, 100 of FIGS. 1-3) comprising one or more star-delta switchable electrical machines 420 of the type described above. It should be appreciated that, unless the context clearly dictates otherwise, the steps of the method 500 may be performed in a different order and some steps may be omitted. The method 500 is performed under the control of a control system 160 of the power and propulsion system, which may be or may comprise an EEC, FADEC or other controller.

At the start of the method 500, a star-delta switchable electrical machine 420 is in one of the star configuration or the delta configuration.

At 510, the control system 160 monitors the power and propulsion system 100 for faults. For example, the control system may monitor the power and propulsion system for a fault in one or more power electronics converters 130, 430 or a fault, such as a short-circuit fault, in the DC electrical network 140. Those skilled in the art will be familiar with various ways of detecting electrical faults (e.g., voltage and current measurements at suitable locations) so these will not be described in detail.

If the control system 160 detects a fault, the method proceeds to 520. At 520, the control system 160 switches the star-delta electrical machine 420 into the third (crow-bar) switching state shown in FIG. 10. Specifically, the control system 160 controls the switches of the switching arrangement 450 to join the stator terminals together, for example by closing both sets of contactors $S_{1-3}$, $D_{1-3}$. This prevents the electrical machine 420 from supplying current to the fault site.

Short circuit faults in the DC electrical network 140 may be a particular concern because it results in the AC and DC sides of the AC:DC converters assuming a low voltage condition, which in the limit may be zero. In this condition, the amount of current supplied to the electrical network 140 by the electrical machines will depend mostly on the stator terminal voltages and impedances of the electrical machines. For permanent magnet electrical machines in particular, the resulting current can be very high and largely dependent on the rotor speed. Thus, preventing the permanent magnet electrical machine 420 from supplying fault current to the fault site using the crowbar state may be particularly advantageous.

If no fault is detected at 510, the method proceeds to 530 where the control system 160 monitors at least one operating condition of the power and propulsion system 100. The at least one operating condition is indicative of a terminal voltage at the terminals of the stator windings of the star-delta electrical machine 420. The operating condition may be the terminal voltage itself, measured using appropriately located sensors. Alternatively, the at least one operating condition may be a proxy for the voltage. Examples include the electrical machine rotor speed, the speed of an engine shaft, a throttle lever position or a rate of change any of these. Other examples will occur to those skilled in the art.

The method then proceeds to 540 where the control system 160 monitors an electrical power demand of electrical loads connected with to the DC electrical network 140. The electrical loads may include, for example, electrically powered engine accessories such as fuel and oil pumps, electrically powered anti-icing systems and various actuators located about the engine(s) and airframe of the aircraft 1. The loads could also include an ESS 150, which may require charging at various times during a flight. Likewise, the loads could include one or more spool-coupled electrical machines 121, 122 if, for example, an engine spool requires acceleration to improve engine operability. The power demand may be an instantaneously measured power demand or a predicted power demand.

If the star-delta electrical machine 420 is presently connected in the star configuration, the method 500 proceeds to 551. If the star-delta electrical machine 420 is presently connected in the delta configuration, the method 500 proceeds to 561.

At 551, the control system 160 determines, based on the at least one operating parameter indicative of the stator terminal voltage, whether the stator 422 of the electrical machine 420 should be switched from the star configuration to the delta configuration to reduce the terminal voltage by a factor of about $\sqrt{3}$. For example, if the at least one operating condition indicates that the stator terminal voltage has increased beyond a threshold voltage level or will soon pass a threshold because of a high rate of change of the voltage, the control system 160 determines that the electrical machine 420 should be switched from the star configuration to the delta configuration. In this case, the method proceeds to 552. If the control system 160 instead determines that no switching is necessary, the method proceeds to 553.

At 552, the control system 160 switches the stator 422 of the electrical machine 420 from the star configuration to the delta configuration. For example, the control system 160 may open the first set of contactor $S_{1-3}$ and close the second set of contactors $D_{1-3}$ of the switching arrangement 450. The method 500 then proceeds back to the start.

At 553, the control system 160 determines, based on the electrical power demand of the DC electrical network 140, whether the stator 422 of the electrical machine 420 should be switched from the star configuration to the delta configuration to reduce the terminal voltage by a factor of about $\sqrt{3}$. For example, if the electrical power demand has reduced below a threshold level or is predicted to soon pass below a threshold level, the control system 160 determines that the electrical machine 420 should be switched from the star configuration to the delta configuration. In this case, the method proceeds to 552 and the stator 422 is switched to the delta configuration. If the control system 160 instead determines that no switching is necessary, the method proceeds to back to the start.

Returning to 540, if the star-delta electrical machine 420 is presently connected in the delta configuration at 420, the method 500 proceeds to 561.

At 561, the control system 160 determines, based on the at least one operating parameter indicative of the stator terminal voltage, whether the stator 422 of the electrical machine 420 should be switched from the delta configuration to the star configuration to increase the terminal voltage by a factor of about $\sqrt{3}$. For example, if the at least one operating condition indicates that the stator terminal voltage has decreased below a threshold voltage level or will soon pass below a threshold because of a high rate of change of the voltage, the control system 160 determines that the electrical machine 420 should be switched from the delta configuration to the star configuration. In this case, the method proceeds to 562. If the control system 160 instead determines that no switching is necessary, the method proceeds to 563.

At 562, the control system 160 switches the stator 422 of the electrical machine 420 from the delta configuration to the star configuration. For example, the control system 160 may close the first set of contactor $S_{1-3}$ and open the second set of contactors $D_{1-3}$ of the switching arrangement 450. The method 500 then proceeds back to the start.

At 563, the control system 160 determines, based on the electrical power demand of the DC electrical network 140, whether the stator 422 of the electrical machine 420 should be switched from the delta configuration to the star configuration to increase the terminal voltage by a factor of about $\sqrt{3}$. For example, if the electrical power demand has increased above a threshold level or is predicted to soon exceed a threshold level, the control system 160 determines that the electrical machine 420 should be switched from the delta configuration to the star configuration. In this case, the method proceeds to 562 and the stator 422 is switched to the star configuration. If the control system 160 instead determines that no switching is necessary, the method proceeds to back to the start.

It should be appreciated that although the method 500 has been described with reference to a single star-delta permanent magnet electrical machine 420, it could equally be applied to multiple star-delta electrical machines 420. It should also be appreciated that whilst method steps 551 and 553, and similarly steps 561 and 563, have been described as separate steps, they could be combined. For example, the control system 160 may make a holistic decision as to whether to switch the stator 422 from/to the delta configuration based on both the stator terminal voltage and the electrical power demand. In this way, the control system 160 may avoid decreasing the AC-side voltage during a period of very high electrical power demand or increasing the AC-side voltage during a period of very low electrical power demand.

As mentioned previously, although FIGS. 6-10 illustrate a single star-delta electrical machine 420, this electrical machine 420 may form part of a wider power and propulsion system such as those described with reference to FIGS. 1-3. The systems include one or more additional power sources. For example, the electrical machine 420 may be one of a plurality of sub-machines (e.g., sub-machines 121', 121" of the electrical machine 121 in FIG. 2) and/or one of a plurality of electrical machines (e.g., electrical machines 121, 122 in FIG. 2). Additionally, or alternatively, the power and propulsion system may include an ESS 150. Each of these additional power sources can supply the DC electrical network 140 with electrical power.

The process of switching the windings 422 of the electrical machine 420 between the star and delta configurations will take a finite amount of time, likely of the order of 10s of milliseconds. During the time interval, if the electrical machine 420 was being operated as a generator, there will be an interruption in the power flow from the electrical machine 420 to the DC electrical network 140. Thus, in some embodiments, during this time interval one or more of the additional electrical power sources may be utilized to ensure the DC electrical network is adequately supplied with electrical power during the switching time interval.

For example, an amount of electrical power delivered by an ESS 150 to the DC electrical network may be increased for the time interval when the stator windings 422 are switched. Additionally or alternatively, one or more additional electrical machines (e.g., an additional sub-machine or separate electrical machine) may be operated in a generator mode to supply the DC electrical network 140. Where one or more additional electrical machines were already operating as generators, they may be controlled to generate an increased amount of electrical power in the time interval.

In some embodiments, the amount of electrical power supplied by the electrical machine 420 to the DC electrical network may be reduced, for example to zero, prior to the start of the time interval in which it the stator windings 422 are scheduled to be switched. In a specific embodiment, the amount of electrical power supplied by the electrical machine 420 is ramped down at a finite rate to zero prior to the start of the switching time interval. At the same time, the amount of power supplied by one or more additional electrical power sources is ramped up to account for the reduction in power supplied by the star-delta electrical machine 420.

Where the one or more additional power sources comprises an electrical machine, said electrical machine may or may not be a permanent magnet electrical machine with star-delta switchable stator windings. Where the additional electrical machine is of the star-delta switchable type, it may be necessary to switch multiple electrical machines from the star configuration to the delta configuration (or from the delta configuration to the star configuration) in response to a change in an operating condition of the power and propulsion system. In this case, the control system 160 may schedule non-overlapping time intervals in which the stator windings 422 of the two star-delta switchable machines are switched. In this way, the DC electrical network 140 can be supplied with power from one or more electrical generators even during a switching event. In a specific embodiment, the power and propulsion system comprises a first star-delta switchable electrical machine 121 connected to an HP spool of a gas turbine engine and a second star-delta switchable electrical machine 122 connected to an LP spool of the gas turbine engine. When the control system 160 determines it is desirable to switch the stators of the two electrical machines 121, 122 between the star and delta configurations (e.g., in response to an increase or decrease in engine speed), the control system 160 schedules non-overlapping time intervals for switching the stators of the two machines. Thus, at all times at least one of the HP and LP electrical machines 121, 122 is able to supply the DC network with electrical power.

Figure 12:
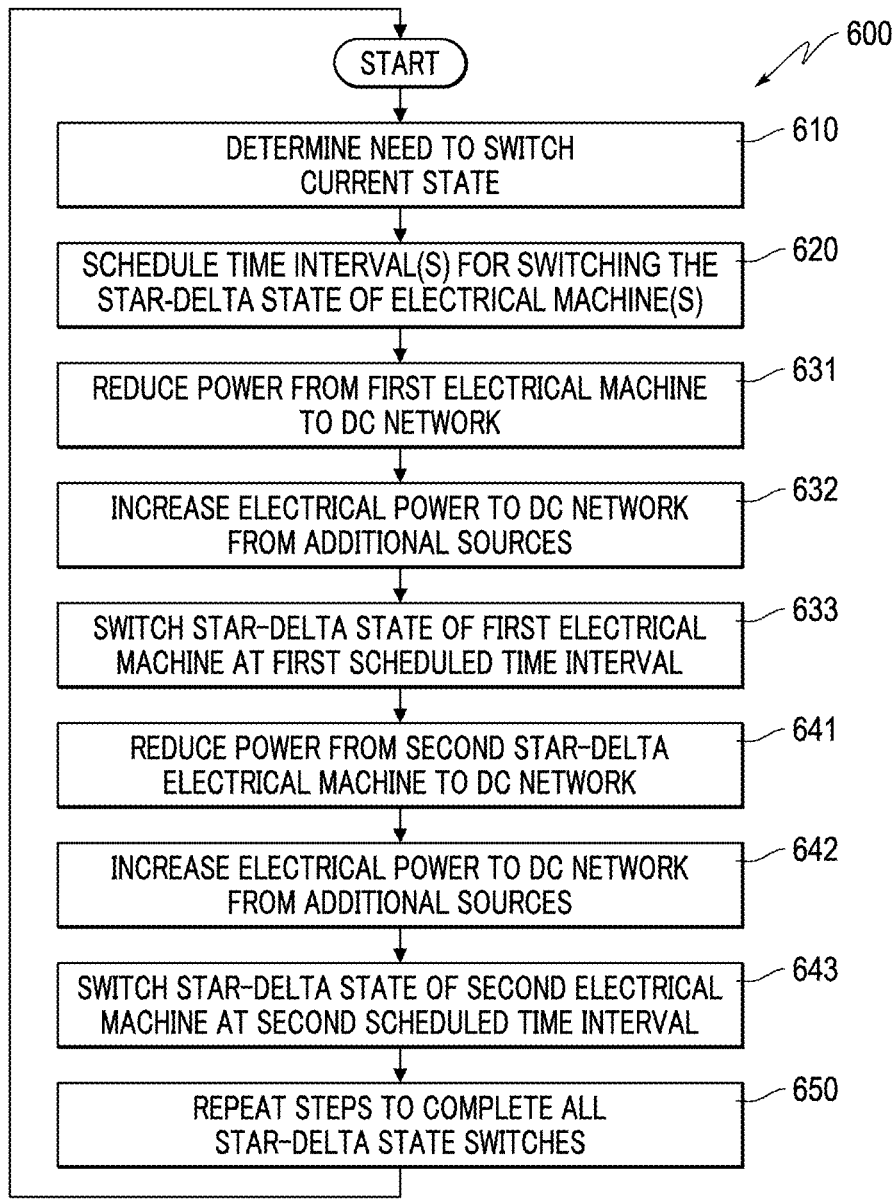
FIG. 12 is a flow chart illustrating a further method of operating an aircraft power and propulsion system.

FIG. 12 is a flow chart illustrating a further method 600 of operating an aircraft power and propulsion system (e.g., the systems 10, 100 of FIGS. 1-3) comprising one or more star-delta switchable electrical machines 420 of the type described above. The system further includes one or more additional electrical power sources, for example an EES 150 and/or electrical machine 121, 122 operable as a generator. It should be appreciated that, unless the context clearly dictates otherwise, the steps of the method 600 may be performed in a different order and some steps may be omitted. The method 600 is performed under the control of a control system 160 of the power and propulsion system, which may be or may comprise an EEC, FADEC or other controller.

At the start of the method 600, a first permanent magnet star-delta switchable electrical machine 420 is in one of the star configuration or the delta configuration. If the one or more additional electrical power sources comprises a second permanent magnet star-delta switchable electrical machine 420, this is also in one of the star configuration or the delta configuration. Generally, both of the permanent magnet star-delta switchable electrical machines 420 will be in the same one of the two configurations, although this is not necessarily the case.

At 610, the control system 160 makes a determination that the first star-delta switchable electrical machine 420 should be switched from/to the star configuration to/from the delta configuration to reduce/increase the AC-side voltage by a factor of about $\sqrt{3}$. As explained above, the determination may be made based on one or more monitored operating conditions of the power propulsion system 100. For brevity this will not be repeated.

Where the power propulsion system 100 includes a second star-delta switchable electrical machine 420, the control system 160 may also make a determination that the second electrical machine 420 should be switched from/to the star configuration to/from the delta configuration. Likewise, if there is a third (fourth, etc.) star-delta switchable electrical machine 420, the control system 160 may make a similar determination.

At 620, the control system 160 schedules a first time interval for switching the stator windings 422 of the first star-delta electrical machine 420 from/to the delta configuration. The scheduled time interval will generally be of the order of tens of milliseconds, for example 10-100 ms.

Where there is a second (and optionally a third, fourth, etc.) star-delta electrical machine 420, the control system 160 may also schedule a second (third, fourth, etc.) time interval for switching the stator windings 422 of the second (third, fourth, etc.) star-delta electrical machine 420 from/to the delta configuration. In a specific embodiment the first and second (and third, fourth, etc.) time intervals are non-overlapping time intervals. In other words, the switching of the stator windings of the second star-delta electrical machine will not begin until the switching of the stator windings of the first star-delta electrical machine is complete.

At 631, prior to the start of the first time interval, the control system 160 controls the first star-delta electrical machine 420 to reduce an amount of electrical power it generates and supplies to the DC electrical network 140. For example, if possible, the rotor of the electrical machine may be disconnected from the shaft of the gas turbine engine so that it is no longer driven by the shaft. As another example, the control system 160 may control parameters of the associated AC:DC converter 430 to reduce the generated power. In a specific embodiment, the amount of electrical power supplied from the first star-delta electrical machine 420 may be gradually ramped down, possibly to zero, prior to the start of the first time interval.

At 632, prior to the start of the first time interval, the control system 160 controls one or more additional electrical power sources to increase an amount of electrical power they supply to the DC electrical network 140. For example, the control system 160 may command an ESS 150 to discharge, or to increase a rate of its discharge, to increase the supply of power to the DC network 140 to offset the decrease in the supply of power from the first star-delta electrical machine 420. Additionally or alternatively, the additional power source may comprise one or more electrical machines operable as generators. The control system 160 may command these one or more electrical to operate as generators, or increase an amount of electrical power they extract from their associated engine spools.

The method proceeds to 633, where the scheduled first time interval begins and control system 160 switches the stator 422 of the first star-delta electrical 420 from/to the star configuration to/from the delta configuration. This reduces/increases the stator terminal voltage by a factor of about √3.

The method proceeds to 641, where, prior to the start of the second time interval, the control system 160 controls the second star-delta electrical machine 420 to reduce an amount of electrical power it generates and supplies to the DC electrical network 140. As before, the amount of electrical power may be ramped down gradually, possibly to zero, prior to the start of the second time interval.

At 642, prior to the start of the second time interval, the control system 160 controls one or more additional electrical power sources to increase an amount of electrical power they supply to the DC electrical network 140. As before, the one or more additional power source may comprise and ESS 150 or one more additional electrical machines. The one or more additional electrical machines may include the first star-delta electrical machine 420 whose switching has been completed.

The method proceeds to 643, where the scheduled second time interval begins and control system 160 switches the stator 422 of the second star-delta electrical 420 from/to the star configuration to/from the delta configuration.

The method then proceeds to 650 where, if there are further (third, fourth, etc.) star-delta permanent magnet electrical machines, the actions of steps 641-643 are repeated until all of the star-delta permanent magnet electrical machines have been switched from/to the star configuration to/from the delta configuration.

It will be understood that the invention is not limited to the embodiments described above and various modifications and improvements can be made without departing from the scope of the appended claims. Except where mutually exclusive, any of the features may be employed separately or in combination with any other features and the disclosure extends to and includes all combinations and sub-combinations of one or more features described herein.

The invention claimed is:

1. An aircraft power and propulsion system, comprising:
   a gas turbine engine;
   a DC electrical network;
   a permanent magnet electrical machine comprising a rotor drivingly coupled to a spool of the gas turbine engine, and a stator comprising windings controllably switchable between a star configuration and a delta configuration;
   an AC-DC power electronics converter, an AC side of which is connected to terminals of the stator windings of the permanent magnet electrical machine and a DC side of which is connected to the DC electrical network;
   an additional electrical power source connected to and controllable to supply electrical power to the DC electrical network; and
   a control system configured to control the switching of the stator windings between the star configuration and the delta configuration and to control the additional electrical power source to supply an increased electrical power to the DC electrical network during a time interval when the stator is being switched between the star configuration and the delta configuration.

2. The aircraft power and propulsion system of claim 1, wherein the additional electrical power source comprises an electrical energy storage unit, the control system being configured to control the electrical energy storage unit to discharge during the time interval when the stator is being switched between the star configuration and the delta configuration.

3. The aircraft power and propulsion system of claim 1, wherein:
   the permanent magnet electrical machine is a first electrical machine and the additional electrical power source comprises a second electrical machine;
   the aircraft power and propulsion system further comprises a second AC-DC power electronics converter, an AC side of which is connected to terminals of windings of the second electrical machine and a DC side of which is connected to the DC electrical network; and
   the control system is configured to control the second electrical machine to operate in a generator mode during the time interval when the stator of the first electrical machine is being switched between the star configuration and the delta configuration.

4. The aircraft power and propulsion system of claim 3, wherein:
   a rotor of the second electrical machine is drivingly coupled to the spool of the gas turbine engine; or
   the rotor of the second electrical machine is drivingly coupled to a second spool of the gas turbine engine; or
   the aircraft power and propulsion system further comprises a second gas turbine engine, and the rotor of the second electrical machine is drivingly coupled to a spool of the second gas turbine engine.

5. The aircraft power and propulsion system of claim 1, wherein:
   the permanent magnet electrical machine is a first permanent magnet electrical machine and the additional electrical power source comprises a second permanent magnet electrical machine, the second permanent magnet electrical machine comprising a rotor drivingly coupled to the spool of the gas turbine engine and stator windings controllably switchable between a star configuration and a delta configuration;

the aircraft power and propulsion system further comprises a second AC-DC power electronics converter, an AC side of which is connected to terminals of windings of the second permanent magnet electrical machine and a DC side of which is connected to the DC electrical network; and the control system is configured to schedule timings for switching the stator windings of each of the first and second permanent magnet electrical machines between the star and delta configurations, the scheduled timings comprising a first time interval for switching the stator windings of the first permanent magnet electrical machine and a second time interval for switching the stator windings of the second permanent magnet electrical machine, the first and second time intervals being non-overlapping time intervals.

6. The aircraft power and propulsion system of claim 5, wherein:
the rotor of the second permanent magnet electrical machine is drivingly coupled to the spool of the gas turbine engine; or
the rotor of the second permanent magnet electrical machine is drivingly coupled to a second spool of the gas turbine engine; or
the aircraft power and propulsion system further comprises a second gas turbine engine, and the rotor of the second permanent magnet electrical machine is drivingly coupled to a spool of the second gas turbine engine.

7. The aircraft power and propulsion system of claim 1, wherein the AC-DC power electronics converter is a passive AC-DC power electronics converter.

8. The aircraft power and propulsion system of claim 1, wherein the control system is further configured to control a voltage level at the DC side of the AC-DC power electronics converter by controlling the AC-DC power electronics converter to implement one or more of modulation index control, field weakening control or fielding strengthening control.

9. The aircraft power and propulsion system of claim 1, wherein the DC network has a voltage of at least 270 V.

10. An aircraft comprising the aircraft power and propulsion system of claim 1.

11. A method of controlling an aircraft power and propulsion system,
the system comprising: a gas turbine engine; a DC electrical network; a permanent magnet electrical machine comprising a rotor drivingly coupled to a spool of the gas turbine engine and a stator comprising windings switchable between a star configuration and a delta configuration; and an AC-DC power electronics converter, an AC side of which is connected to terminals of the stator windings of the permanent magnet electrical machine and a DC side of which is connected to the DC electrical network; and an additional electrical power source connected to DC electrical network,
the method comprising:
switching the stator windings of the permanent magnet electrical machine between the star configuration and the delta configuration during a time interval;
supplying an increased electrical power from the additional electrical power source to the DC electrical network during the time interval.

12. The method of claim 11, further comprising:
scheduling the time interval for the switching of the stator windings between the star configuration and the delta configuration;
prior to a start of the time interval, reducing an amount of the electrical power supplied to the DC electrical network by the permanent magnet electrical machine and increasing the amount of the electrical power supplied to the DC electrical network by the additional electrical power source.

13. The method of claim 11, wherein an amount of the electrical power supplied to the DC electrical network by the permanent magnet electrical machine is reduced to zero prior to the time interval.

14. The method of claim 11, wherein the time interval is between 10 ms and 100 ms.

15. The method of claim 11, further comprising:
operating the gas turbine engine such that a speed range of the spool during non-idle operation is at least 2:1, which is a ratio of a speed of a shaft of the gas turbine engine during a maximum take-off operating condition divided by the speed of the shaft during a descent operating condition.

16. The method of claim 11, further comprising:
controlling a voltage level at the DC side of the AC-DC power electronics converter by controlling the AC-DC power electronics converter to implement one or more of modulation index control, field weakening control or fielding strengthening control.

17. The method of claim 11, wherein the additional electrical power source comprises an electrical energy storage unit, and supplying the electrical power from the additional electrical power source to the DC electrical network during the time interval comprises discharging the electrical energy storage unit during the time interval.

18. The method of claim 11, wherein:
the permanent magnet electrical machine is a first electrical machine and the additional electrical power source comprises a second electrical machine, the second electrical machine comprising a rotor and stator comprising windings;
the aircraft power and propulsion system further comprises a second AC-DC power electronics converter, an AC side of which is connected to terminals of the stator windings of the second electrical machine and a DC side of which is connected to the DC electrical network; and
the method further comprises operating the second electrical machine in a generator mode during the time interval when the stator of the first electrical machine is switched between the star configuration and the delta configuration.

19. The method of claim 11, wherein:
the permanent magnet electrical machine is a first permanent magnet electrical machine and the additional electrical power source comprises a second permanent magnet electrical machine, the second permanent magnet electrical machine comprising a rotor drivingly coupled to the spool of the gas turbine engine and a stator comprising windings controllably switchable between a star configuration and a delta configuration;
the aircraft power and propulsion system further comprises a second AC-DC power electronics converter, an AC side of which is connected to terminals of the stator windings of the second permanent magnet electrical machine and a DC side of which is connected to the DC electrical network; and the method further comprises:
scheduling timings for switching the stator windings of each of the first and second permanent magnet electrical machines between the star and delta configurations, the scheduled timings comprising a first time interval for switching the stator windings of the first electrical machine and a second time interval for switching the stator windings of the second electrical machine;
switching the stator windings of the first permanent magnet electrical machine between the star configuration and the delta configuration during the first time interval; and
switching the stator windings of the second permanent magnet electrical machine between the star configuration and the delta configuration during the second time interval,
wherein the first and second time intervals are non-overlapping time intervals.

* * * * *